United States Patent
Liu et al.

(10) Patent No.: US 8,259,630 B2
(45) Date of Patent: Sep. 4, 2012

(54) METHOD AND SYSTEM FOR SUBCARRIER ALLOCATION IN RELAY ENHANCED CELLULAR SYSTEMS WITH RESOURCE REUSE

(75) Inventors: Yong Liu, Santa Clara, CA (US); Chiu Ngo, San Francisco, CA (US)

(73) Assignee: Samsung Electronics Co., Ltd., Suwon (KR)

(*) Notice: Subject to any disclaimer, the term of this patent is extended or adjusted under 35 U.S.C. 154(b) by 700 days.

(21) Appl. No.: 12/167,967

(22) Filed: Jul. 3, 2008

(65) Prior Publication Data

US 2009/0161612 A1 Jun. 25, 2009

Related U.S. Application Data

(60) Provisional application No. 61/016,372, filed on Dec. 21, 2007.

(51) Int. Cl.
*H04B 7/00* (2006.01)
(52) U.S. Cl. ........................................ 370/310
(58) Field of Classification Search ................... None
See application file for complete search history.

(56) References Cited

U.S. PATENT DOCUMENTS

| | | | |
|---|---|---|---|
| 5,530,575 A | 6/1996 | Acampora et al. |
| 6,590,865 B1 | 7/2003 | Ibaraki et al. |
| 7,349,665 B1 | 3/2008 | Zhu et al. |
| 7,623,863 B2 | 11/2009 | Chen et al. |
| 7,630,355 B2 | 12/2009 | Tao et al. |
| 7,830,916 B2 | 11/2010 | Qi et al. |
| 7,877,057 B2 | 1/2011 | Izumikawa et al. |
| 7,894,388 B2 | 2/2011 | Visotsky |
| 7,916,680 B2 | 3/2011 | Miller et al. |
| 7,916,704 B2 | 3/2011 | Ramachandran et al. |
| 7,917,149 B2 | 3/2011 | Chen et al. |
| 7,990,906 B2 | 8/2011 | Viorel et al. |
| 8,000,283 B2 | 8/2011 | Pandey et al. |
| 8,032,146 B2 | 10/2011 | Zhu et al. |
| 8,055,189 B2 | 11/2011 | Tsai et al. |
| 2004/0136379 A1 | 7/2004 | Liao et al. |
| 2005/0232183 A1 | 10/2005 | Satori et al. |
| 2006/0209671 A1* | 9/2006 | Khan et al. .................... 370/208 |

(Continued)

OTHER PUBLICATIONS

Li, G. et al., "Downlink Radio Resource Allocation for Multi-Cell OFDMA System," IEEE Transaction on Wireless Communications, Dec. 2006, pp. 3451-3459, vol. 5, No. 12, IEEE Communications Society and the Signal Processing Society, IEEE Publications Office—Los Alamitos, CA, USA.

(Continued)

*Primary Examiner* — Chi Pham
*Assistant Examiner* — Fan Ng
(74) *Attorney, Agent, or Firm* — Kenneth L. Sherman, Esq.; Michael Zarrabian, Esq.; Sherman & Zarrabian LLP (57) ABSTRACT

A method and system for assigning subcarrier frequency resource for a relay enhanced cellular communication system including a base station, one or more mobile stations and one or more relay stations, is provided. Subcarrier assignment involves allocating subcarriers to one or more relay communication links between the base station and relay stations, to accommodate minimum data rate requirements of the access communication links; and allocating subcarriers to one or more access communication links between relay stations and mobile stations to approximate the data rates achieved on the corresponding relay communication links, wherein allocating subcarriers to one or more access communication links includes reusing subcarriers among access communication links in different relay cells.

24 Claims, 9 Drawing Sheets

U.S. PATENT DOCUMENTS

| | | | |
|---|---|---|---|
| 2007/0104127 A1* | 5/2007 | Suh et al. | 370/328 |
| 2008/0095037 A1 | 4/2008 | Chang et al. | |
| 2008/0107063 A1 | 5/2008 | Oleszcuk | |
| 2008/0171551 A1 | 7/2008 | Zhu et al. | |
| 2008/0175198 A1* | 7/2008 | Singh et al. | 370/329 |
| 2008/0186900 A1 | 8/2008 | Chang et al. | |
| 2008/0219365 A1 | 9/2008 | Viorel et al. | |
| 2008/0240054 A1 | 10/2008 | Sandhu et al. | |
| 2009/0163218 A1* | 6/2009 | Liu et al. | 455/450 |
| 2009/0163220 A1 | 6/2009 | Liu et al. | |
| 2009/0303918 A1* | 12/2009 | Ma et al. | 370/315 |
| 2009/0312030 A1 | 12/2009 | Lee et al. | |
| 2010/0099352 A1 | 4/2010 | Lee et al. | |
| 2010/0214992 A1* | 8/2010 | Hart et al. | 370/329 |
| 2010/0260113 A1 | 10/2010 | Liu et al. | |
| 2010/0272009 A1 | 10/2010 | Cheng et al. | |
| 2011/0111693 A1 | 5/2011 | Nakao et al. | |
| 2011/0228700 A1 | 9/2011 | Mildh et al. | |

OTHER PUBLICATIONS

Han, Z. et al., "Capacity Optimization Using Subspace Method Over Multicell OFDMA Networks," IEEE Wireless Communications and Networking Conference, Mar. 2004, pp. 2393-2398, vol. 4, IEEE Communications Society, IEEE Publications Office—Los Alamitos, CA, USA.

Huang, L. et al., "Resource Allocation for OFDMA Based Relay Enhanced Cellular Networks," Proceedings of the 65th IEEE Vehicular Technology Conference, Apr. 2007, pp. 3160-3164, IEEE Vehicular Technology Society, IEEE Publications Office—Los Alamitos, CA, USA.

Relay Task Group of IEEE 802.16, "P802.16j Baseline Document for Draft Standard for Local and Metropolitan Area Networks, Part 16: Air Interface for Fixed and Mobile Broadband Wireless Access Systems, Multihop Relay Specification (802.16j-06/026r2)," IEEE 802.16 Working Group, Feb. 9, 2007, pp. 1-58, United States.

Cudak, M. "Draft IEEE 802.16m Requirements (IEEE 802.16m-07/002r3)," IEEE 802.16 Working Group, Aug. 13, 2007, pp. 1-26, United States.

Cudak, M., "IEEE 802.16m System Requirements (IEEE 802.16m-07/002r4)," IEEE 802.16 Working Group, Oct. 19, 2007, pp. 1-26, United States.

Genc, V. et al., "IEEE 802.16j Relay-Based Wireless Access Networks: An Overview," IEEE Wireless Communications, vol. 15, No. 5, IEEE Communications Society, Oct. 2008, pp. 56-63, United States.

IEEE 802.16 Working Group, "Overview of IEEE P802.16m Technology and Candidate RIT for IMT-Advanced," IEEE 802.16 IMT-Advanced Evaluation Group Coordination Meeting, Jan. 13, 2010, IEEE 802.16 Working Group, 2010, pp. 1-87, United States.

Shen, Z. et al., "Adaptive Resource Allocation in Multiuser OFDM Systems With Proportional Rate Constraints," IEEE Transactions on Wireless Communications, vol. 4, No. 6, IEEE, Nov. 2005, pp. 2726-2737, United States.

U.S. Notice of Allowance for U.S. Appl. No. 12/167,980 mailed on Jan. 23, 2012.

U.S. Final Office Action for U.S. Appl. No. 12/167,990 mailed on Jan. 3, 2012.

U.S. Non-Final Office Action for U.S. Appl. No. 12/167,980 mailed on Jun. 24, 2011.

U.S. Non-Final Office Action for U.S. Appl. No. 12/167,990 mailed on Jul. 20, 2011.

U.S. Non-Final Office Action for U.S. Appl. No. 12/422,107 mailed on Sep. 23, 2011.

* cited by examiner

METHOD AND SYSTEM FOR SUBCARRIER ALLOCATION IN RELAY ENHANCED CELLULAR SYSTEMS WITH RESOURCE REUSE

RELATED APPLICATION

This application claims priority from U.S. Provisional Patent Application Ser. No. 61/016,372 filed on Dec. 21, 2007, incorporated herein by reference.

FIELD OF THE INVENTION

The present invention relates to cellular communication and in particular to relay enhanced cellular communication systems.

BACKGROUND OF THE INVENTION

Figure 1A:
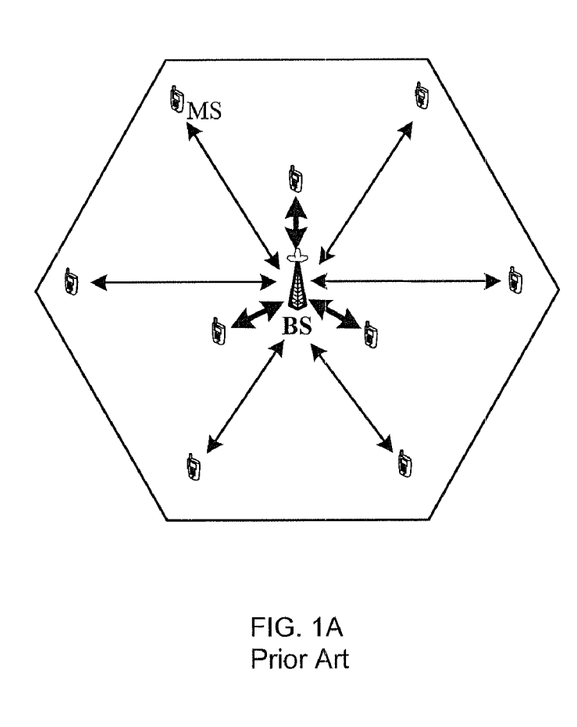
FIG. 1A shows a typical cellular communication system.

A typical cellular communication system includes one or more base stations (BS) and multiple mobile stations, as shown in FIG. 1A. Each BS defines a cell of coverage, where each mobile station (MS) can communicate with a BS via a BS-MS link while within communication range of the BS cell coverage. In many cellular systems, radio resource management (RRM) for orthogonal frequency division multiple access (OFDMA)-based cellular systems is utilized. Such systems address resource allocations (e.g., frequency, time, power), among BS-MS links (i.e., transmission channels defined by frequency carriers, spreading codes or time slots).

There are two types of RRMs: intra-cell RRM and inter-cell RRM. The intra-cell RRM tries to assign resources to MSs or BS-MS links within a cell (and prevent interference among MSs). The inter-cell RRM tries to assign resources to multiple cells (and prevent interference among BSs and MSs in different cells). Available frequency bandwidth is divided into frequency carriers and assigned to the BS-MS links based on channel conditions and traffic demands. End-to-end throughput between a BS and MS is a function of Signal-to-Interference-and Noise-Ratio (SINR) of the link between the BS and MS.

Figure 1B:
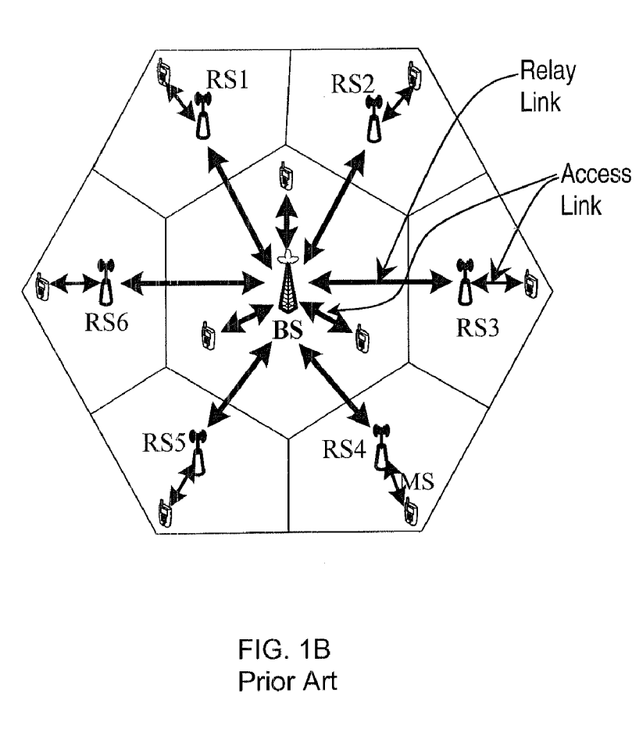
FIG. 1B shows a typical relay enhanced cellular communication system.

Intermediate relay stations (RS) have been used for Page: 3 improving throughput, coverage, and spectrum efficiency of cellular systems. FIG. 1B shows an example cellular system including a base station BS and multiple mobile stations (MS) and relay stations (RS1, . . . , RS6). A two-hop transmission takes place between a BS and MS via a RS, wherein a RS may be an MS itself. The introduction of relay stations brings forth new challenges to the RRM design. RRM for relay enhanced cellular (REC) systems has to address resource allocations among BS-MS, BS-RS, and RS-MS communication links.

In order to support relay stations, communication time frames can be divided into access zones and relay zones. In access zones, relay stations communicate with two-hop mobile stations. In relay zones, relay stations communicate with the BS. The BS can communicate with direct mobile stations (or one-hop mobile stations) in both access zones and relay zones. Note that access zones and relay zones are defined in time domain.

In an REC system, there are two types of cells: BS cells and relay cells. The BS cell is usually adjacent to every relay cell; therefore, it cannot share the same frequency resource with the relay cells. Nevertheless, relay cells that are well separated from each other may reuse subcarriers in their access links. Resource reuse introduces new challenges to subcarrier allocation, however. One conventional subcarrier allocation approach proposes an equal power multi-cell resource allocation process, wherein subcarriers are assigned one-by-one to one or more cells. For each subcarrier, all cells are examined, starting from the most under-assigned one and ending to the most over-assigned one. In each cell, every MS is evaluated on its contribution/harm to the overall throughput. If none of the mobile stations (MSs) in a cell can improve the overall throughput, the cell is skipped. If one or more MSs in a cell can improve the overall throughput, an MS that provides the most benefit to the throughput is assigned the subcarrier. Another conventional subcarrier allocation approach proposes a multi-cell resource allocation process which takes into account minimum data rate constraints. For each subcarrier, all under-assigned MSs are evaluated, starting from the MS that provides the most benefit to the overall throughput. MSs are added to share the subcarrier until no more MSs can benefit the overall throughput. Once a MS achieves its desired data rate, it shall not accept more subcarriers. This constraint is removed when all MSs meet their data rate requirements.

However, such subcarrier allocation approaches are not applicable to subcarrier allocation in REC systems that allow resource reuse among relay cells. Such conventional multi-cell resource allocation approaches handle all cells in the same way. As noted, in an REC system, there are two types of cells: BS cells and relay cells. Because resource reuse is allowed only among relay cells, the relay cells and the BS cell shall be handled differently. Therefore, the conventional approaches cannot be applied.

Figure 2:
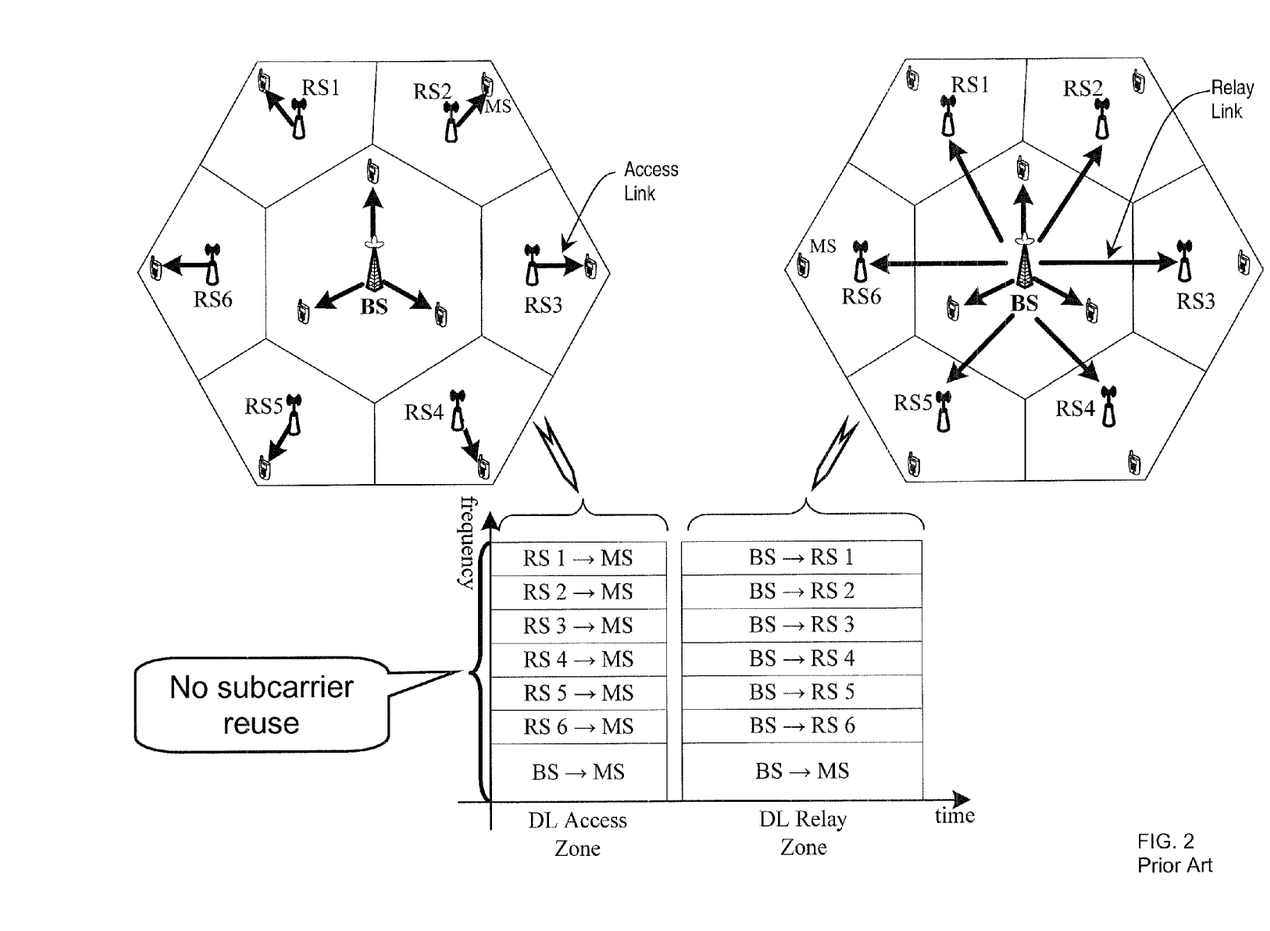
FIG. 2 shows a resource map and communication time frame for a relay enhanced cellular communication system without resource (subcarrier) reuse.

Another conventional approach proposes a three-step subcarrier allocation process for REC systems without resource reuse. First, subcarriers are allocated independently in the access zone and the relay zone to maximize the throughput of each zone. Specifically, each subcarrier is assigned to the communication link (including BS-MS, RS-MS, and BS-RS links) that can achieve the highest data rate increase with the subcarrier. And then, subcarriers are reallocated from over-balanced cells/links to under-balanced cells/links in both the access zone and the relay zone until no improvement could be achieved. Lastly, the power levels of relay links and access links are adjusted to balance capacities of the two-hop links. However, such a three-step approach is directed to REC systems which do not allow resource reuse (FIG. 2). In other words, the base station cell does not share the same frequency resource with the relay station cells. The relay station cells do not share the same frequency resources among themselves, either. When resource reuse is allowed in an REC system, conventional resource allocation approaches are not suitable for subcarrier resource allocation. This is because in a REC system that allows resource reuse, a subcarrier may be assigned to access links in two or more relay cells. Once the subcarriers are assigned, it is impractical to reallocate subcarriers among relay cells since each reallocation (adjustment) affects not only the cells releasing/accepting the subcarrier, but also all other cells that are assigned the same subcarrier.

BRIEF SUMMARY OF THE INVENTION

The invention provides a method and system for subcarrier allocation in relay enhanced cellular systems with resource reuse. One embodiment involves assigning subcarrier frequency resource for a relay enhanced cellular communication system including a base station, one or more mobile stations and one or more relay stations, by allocating subcarriers to one or more relay communication links between the base station and relay stations, to accommodate minimum data rate requirements of the corresponding access communication links; and allocating subcarriers to one or more access communication links between relay stations and mobile stations to approximate the data rates achieved on the corresponding relay communication links, wherein allocating subcarriers to one or more access communication links includes reusing subcarriers among access communication links in different relay cells.

Assigning subcarriers may further include allocating remaining subcarriers to access communication links and relay communication links to essentially maximize system-wide throughput, when all mobile stations meet their minimum data rate requirements, wherein allocating subcarriers to access communication links includes reusing subcarriers among access communication links in different relay cells.

Assigning a set of subcarriers may further include balancing subcarrier allocation for access communication links and relay communication links. Balancing includes balancing subcarrier allocation for access communication links and relay communication links, without adjusting allocation of subcarriers among access communication links.

Assigning a set of subcarriers may include assigning the set of subcarriers to one or more access communication links by: detecting a serving station, among all under-assigned serving stations, with the least achievement-requirement data rate ratio on its access communication links, wherein a serving station is one of a base station or a relay station; if the detected station is a base station, then allocating a subcarrier to the base station, wherein the allocated subcarrier cannot be reused by any relay station; and if the detected station is a relay station, then allocating a subcarrier to the relay station, wherein the allocated subcarrier cannot be reused by the base station. If a subcarrier is allocated to an under-assigned relay station, the subcarrier can also be allocated to other under-assigned relay stations if the allocations can benefit the overall system throughput.

These and other features, aspects and advantages of the present invention will become understood with reference to the following description, appended claims and accompanying figures.

DETAILED DESCRIPTION OF THE INVENTION

The invention provides a method and system for subcarrier allocation in relay enhanced cellular systems with resource reuse. One embodiment provides a subcarrier frequency resource allocation process for relay enhanced cellular systems that allow subcarrier reuse, wherein the invention provides subcarrier allocation for reusing subcarriers among relay cells.

Figure 3:
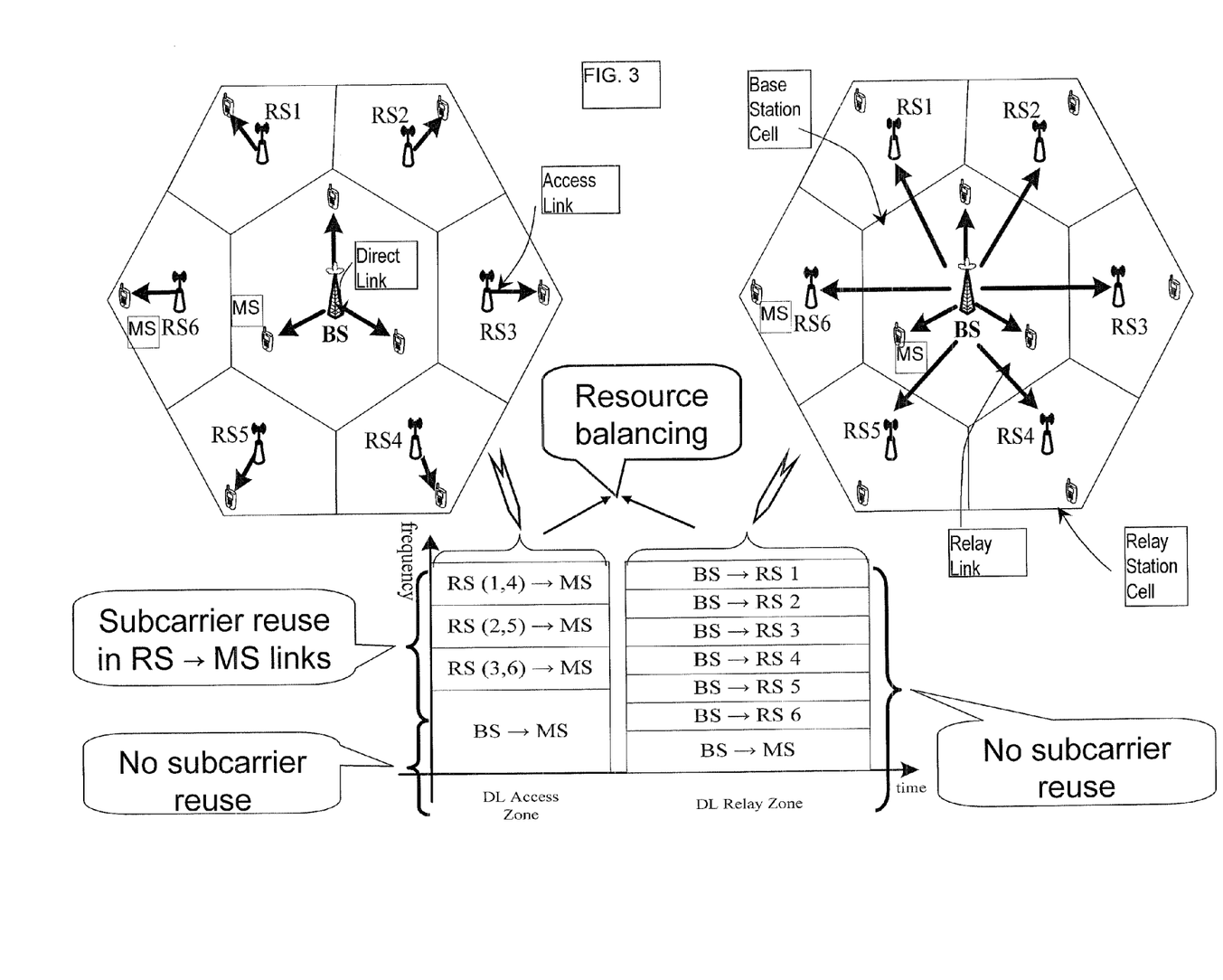
FIG. 3 shows an example resource map and communication time frame for a relay enhanced cellular communication system allowing resource (subcarrier) reuse among relay cells, according to an embodiment of the invention.

In a REC system, relay cells well separated from each other may reuse subcarriers in their access links, as shown by example in FIG. 3, wherein RS1 and RS4 are assigned the same frequency resource, thus reusing this resource in their access links, RS2 and RS4 are assigned the same the same frequency resource, thus reusing this resource in their access links, and RS3 and RS6 are assigned the same the same frequency resource, thus reusing this resource in their access links. BS-MS links can acquire subcarriers in both the relay zone and the access zone. Once BS-RS links cannot obtain sufficient subcarriers in the relay zone, the BS-MS links can release the subcarriers they occupied in the relay zone to the BS-RS links. This is termed "sacrificing" herein. The BS-MS links may redeem the sacrificed subcarriers in the access zone. Similarly, if RS-MS links cannot obtain sufficient subcarriers in the access zone, the BS-MS links can release the subcarriers they occupied in the access zone to the RS-MS links and redeem the sacrificed subcarriers in the relay zone.

The left side of the drawing in FIG. 3 shows resource allocation in the access zone. In the access zone, both BS-MS links (direct links) and RS-MS links (access links) can accept subcarriers. Since the BS cell is close to all relay cells, subcarriers should not be reused between BS-MS links and RS-MS links. However, RS-MS links in different relay cells may reuse the same frequency resource if they do not cause serious interferences to each other. The right side of FIG. 3 illustrates resource allocation in the relay zone. In the relay zone, both BS-MS links and BS-RS links can accept subcarriers. Since all links are originated from the BS, in order to avoid intra-cell interference, no subcarrier reuse is allowed in this zone.

The present invention provides an RRM approach for resource allocation in REC systems with resource reuse among relay cells. Such resource allocation comprises frequency resource (subcarriers) allocation.

Figure 4:
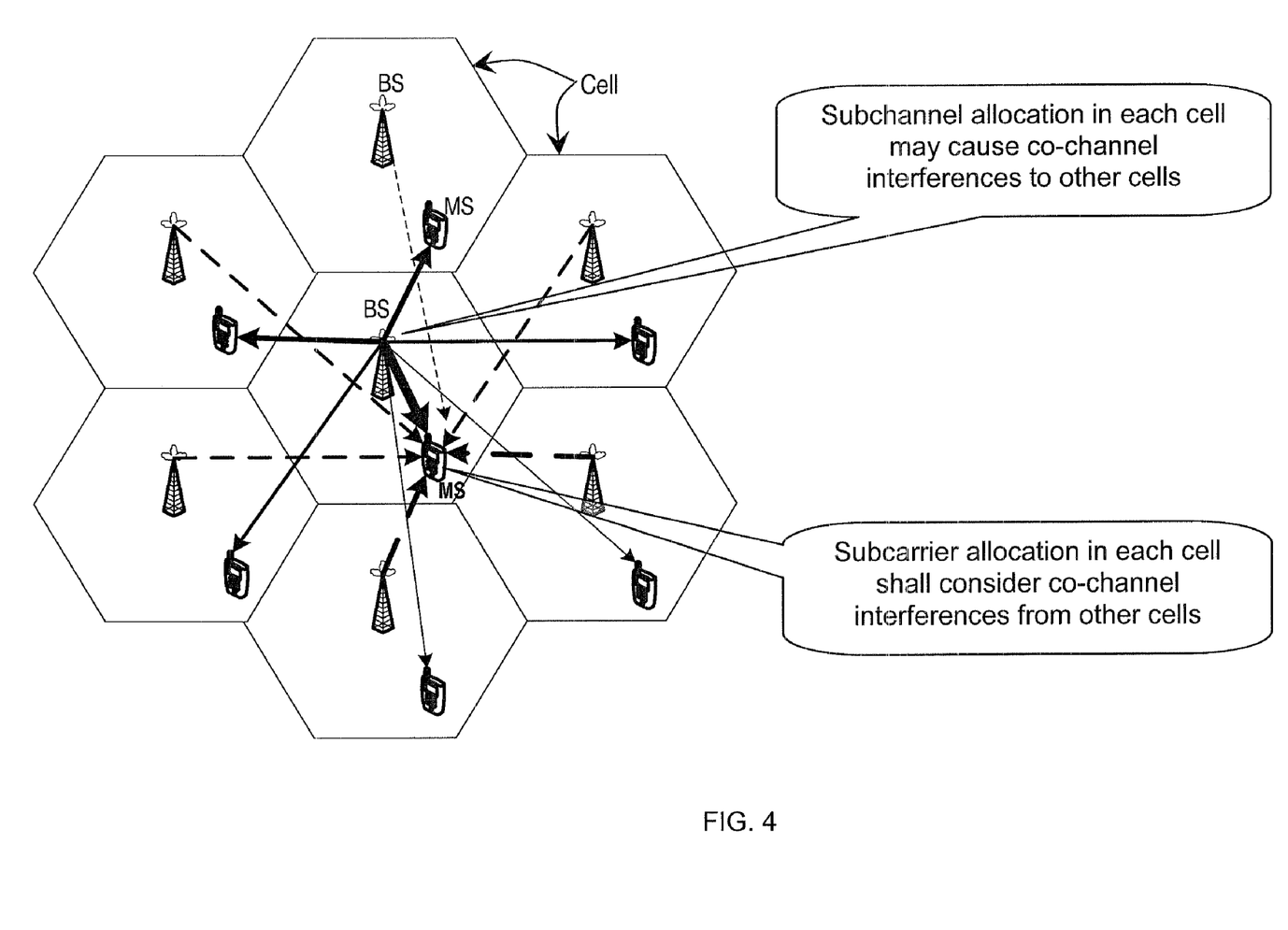
FIG. 4 shows a multi-cell system that allows resource reuse.

In an OFDMA-based multi-cell system that allows frequency resource reuse, the allocation of a subcarrier within a cell has to count the interferences both from, and to, co-channel cells as shown by example in FIG. 4. In order to maximize the overall system throughput, a subcarrier is usually assigned to a MS that can provide most benefit to the overall multi-cell system throughput, instead of just the local cell throughput.

In one implementation of the invention, subcarrier allocation in the access zones of a REC system is applied in the multi-cell REC system including a BS cell and relay cells. Further, resource balancing is provided for access zone and relay zone subcarrier allocations. In the resource balancing process, subcarrier adjustment among relay cells is avoided. Subcarrier allocation further involves increasing, and preferably maximizing, the total throughput of an OFDMA-based REC system, by joint considering: subcarrier allocations in both the access zone and relay zone, spectral efficiency/multi-user diversity, subcarrier reuse among relay cells, minimum data rate requirements of mobile stations, and balancing between access and relay communication links. Such resource balancing matches the capacities of access links and relay links without conducting subcarrier adjustment among relay cells. Resource allocation for resource reuse among relay cells in a REC system enables optimal radio resource management (RRM) in OFDMA-based broadband wireless standards, such as IEEE 802.16j and IEEE 802.16m, and others.

An example implementation is described below based on the following definitions

DEFINITIONS

N: The number of subcarriers
L: The number of RSs
$M_j$: The number of MSs served by BS/RS j (BS: j=0, RS: j=1, ..., L)
$T_F$: The time duration of the downlink frame
$T_R$: The time duration of the relay zone
$T_A$: The time duration of the access zone
$r_{XY,j_k}^{(n)}$: The achievable data rate of the $XS_j$–$YS_k$ link on subcarrier n (BS: j=0, RS: j=1, ..., L)
$r_{j_k}^o$: The minimum data rate requirement of YS k (served by XS j)

$$\alpha_{XY,j_k}^{(n)} = \begin{cases} T_A/T_F: & \text{If subcarrier } n \text{ is assigned to the } XS_j - YS_k \text{ link in the access zone} \\ 0: & \text{If subcarrier } n \text{ is not assigned to the } XS_j - YS_k \text{ link in the access zone} \end{cases}$$

$$\beta_{XY,j_k}^{(n)} = \begin{cases} T_R/T_F: & \text{If subcarrier } n \text{ is assigned to the } BS - YS_k \text{ link in the relay zone} \\ 0: & \text{If subcarrier } n \text{ is not assigned to the } BS - YS_k \text{ link in the relay zone} \end{cases}$$

$$R_{BM}^o = \sum_{k=1}^{M_0} r_{0_k}^o : \text{The aggregated data rate requirements of 1-hop MSs}$$

$$R_{BRM}^o = \sum_{j=1}^{L} \sum_{k=1}^{M_j} r_{j_k}^o : \text{The aggregated data rate requirements of 2-hop MSs}$$

$$R_{BRM_j}^o = \sum_{k=1}^{M_j} r_{j_k}^o : \text{The aggregated data rate requirements of 2-hop MSs in relay cell } j (j = 1, \ldots, L)$$

End-to-end throughput of all 1-hop MSs:

$$R_{BM} = \sum_{k=1}^{M_0} r_{BM,0_k}, \text{ or}$$

$$R_{BM} = R_{BMa} + R_{BMr}$$

where, $$r_{BM,0_k} = \sum_{n=1}^{N} \alpha_{BM,0_k}^{(n)} \cdot r_{BM,0_k}^{(n)} + \sum_{n=1}^{N} \beta_{BM,0_k}^{(n)} \cdot r_{BM,0_k}^{(n)}$$

$$R_{BMa} = \sum_{k=1}^{M_0} \sum_{n=1}^{N} \alpha_{BM,0_k}^{(n)} \cdot r_{BM,0_k}^{(n)}$$

$$R_{BMr} = \sum_{k=1}^{M_0} \sum_{n=1}^{N} \beta_{BM,0_k}^{(n)} \cdot r_{BM,0_k}^{(n)}$$

End-to-end throughput of all two-hop MSs $$R_{BRM} = \sum_{j=1}^{L} R_{BRM,j}$$

where, $$R_{RM,j} = \sum_{k=1}^{M_j} r_{RM,j_k}, j = 1, \ldots, L$$

$$r_{RM,j_k} = \sum_{n=1}^{N} \alpha_{RM,j_k}^{(n)} \cdot r_{RM,j_k}^{(n)}, j = 1, \ldots, L$$

$$R_{BR,j} = \sum_{n=1}^{N} \beta_{BR,0_j}^{(n)} \cdot r_{BR,0_j}^{(n)}$$

$$R_{BRM,j} = \min\{R_{RM,j}, R_{BR,j}\}$$

System overall throughput $R_{all} = R_{BM} + R_{BRM}$,

A BS-MS link is under-assigned, if:

$r_{BM,0_k} < r_{0_k}^o$, for any k=1, 2, ..., $M_0$.

A RS-MS link is under-assigned, if:

$r_{RM,j_k} < r_{j_k}^o$, for any j=1, ... L; k=1, ..., $M_j$.

A BS-RS link is under-assigned, if $R_{BR,j} < R_{BRM,j}^o$, for any j=1, 2, ..., L.

A RS cell is under-assigned, if $R_{RM,j} < R_{BRM,j}^o$, for any j=1, 2, ..., L.

A relay cell and its corresponding BS-RS link is balanced, if $|R_{BR,j} - R_{RM,j}| < \epsilon$, for any j=1, ..., L.

A relay cell is over-balanced, or a BS-RS link is under-balanced, if $R_{RM,j} - R_{BR,j} \geq \epsilon$, for any j=1, ..., L.

A relay cell is under-balanced, or a BS-RS link is over-balanced, if $R_{BR,j} - R_{RM,j} \geq \epsilon$, for any j=1, ..., L.

A BS-MS link is under-charged, if $$\frac{r_{BM,0_k}}{r_{0_k}^2} < \max_{p=1,\ldots,L}\left(\frac{R_{BRM,p}}{R_{BRM,p}^2}\right) \text{ for any } k = 1, \ldots, M_0.$$

In a preferred embodiment, the invention focuses on downlink communications from serving stations to relay and mobile stations. Every communication link should be assigned enough resource to achieve a minimum data rate. The transmission power from BS and relay stations are fixed. In other words, power control is not considered as a means to optimize/balance resource allocation. Also, a single cell system is considered. As such, inter-cell interferences from other BS cells are not counted. A MS communicates with BS either directly (one-hop), or through one relay station (two-hop). Communication via two or more relay stations (i.e., larger than two-hop) is not considered. Relay cells can reuse frequency (subcarrier) resource among their access links, and the resource controller responsible for subcarrier allocation is aware of the achievable data rate of each link on each subcarrier.

To avoid subcarrier adjustment among relay cells according to an embodiment of the invention, the capacities of relay cells are not to exceed those of the corresponding relay links. Otherwise, subcarriers have to be moved (reallocated) from the over-balanced relay cells to under-balanced relay cells or to the BS cell. In other words, relay cells always follow and match the capacities of relay links. Therefore, subcarriers are first allocated in the relay zone such that relay links can accommodate the minimum data rate requirements of corresponding access links; and then, subcarriers are allocated in the access zone such that access links match the achieved data rates on relay links.

When a subcarrier is allocated in the access zone, the most under-assigned cell is first identified. If the cell is the BS cell, the subcarrier is assigned to the BS cell, and is not reused by any relay cell. If the most under-assigned cell is a relay cell, the subcarrier can be assigned to the relay cell as well as other relay cells, but is not to be reused by the BS cell. Since access links of one-hop mobile stations can acquire subcarriers in both the access zone and the relay zone, resource allocations to these links can be adjusted in the two zones to help two-hop mobile stations meet their requirements.

If resources are sufficient in both the access zone and the relay zone to satisfy the minimum data rate requirements of all mobile stations, the remaining subcarriers in the relay zone are first allocated in a greedy approach; and then, the remaining subcarriers in the access zone are allocated such that access links match the achieved data rates on relay links. If, after the match, there remain subcarriers in the access zone, such subcarriers are allocated to the access links of one-hop mobile stations. If insufficient subcarriers remain in the access zone to enable the access links to complete the match, subcarriers are moved (reallocated) from over-balanced relay links to the access links of one-hop mobile stations.

A greedy approach involves assigning each subcarrier to the communication link that can achieve the high data rate increase (with this subcarrier) among all other links. In other words, a subcarrier is assigned to the link that can make the best usage of this subcarrier.

Figure 5:
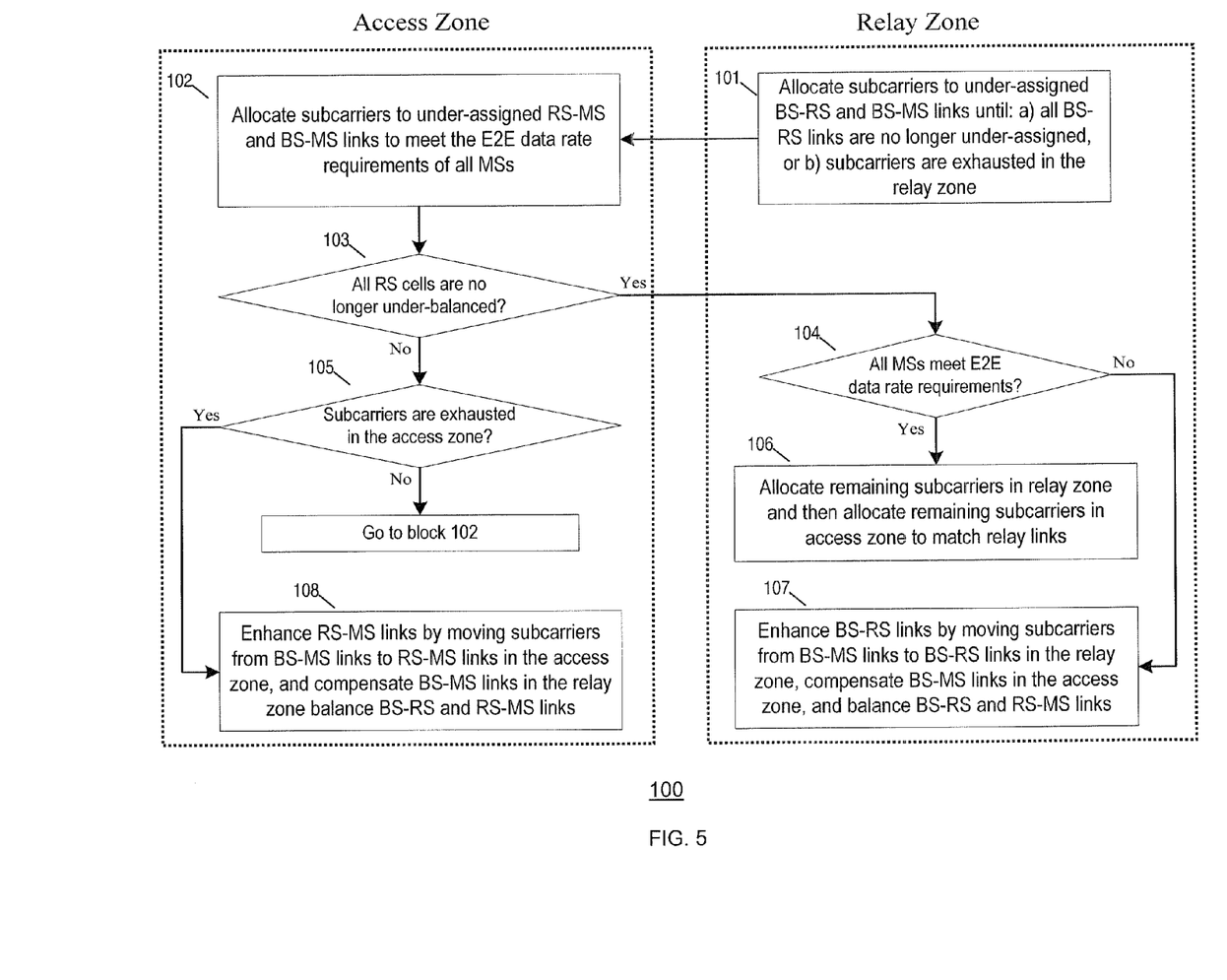
FIG. 5 shows a functional block diagram for allocating subcarrier frequency resources for a relay enhanced cellular communication system, according to an embodiment of the invention.

FIG. 5 shows an example subcarrier allocation process 100 according to the present invention:

Block 101: Subcarriers are assigned (allocated) to both BS-RS and BS-MS links in a relay zone until all BS-RS links are no longer under-assigned, or until subcarriers are exhausted in the relay zone. Initially, each link is assigned the best unallocated subcarrier, on which it can achieve the highest data rate increase. The initial link allocation sequence can be random, or based on certain priorities (e.g., the descending sequence of the maximum achievable rates over all unallocated subcarriers). Iterations are then started to allocate remaining subcarriers to the under-assigned BS-RS and BS-MS links. In each iteration, the most under-assigned serving station, which can be either the BS or a RS, is first identified. If the serving station is a RS, the corresponding BS-RS link is selected for subcarrier allocation. If the serving station is the BS, the most under-assigned BS-MS link is selected for subcarrier allocation. The link selection process can be expressed as:

$$[BY^*, p^*] = \left(\frac{R_{BMr}}{R_{BM}^2} < \min\left(\frac{R_{BR,p}}{R_{BRM,p}^2}\right)?\bigg| \arg_{[BM,p]}\right.$$

$$\min_{p=1,2,\ldots,M_0}\left(\frac{r_{BMr,0_p}}{r_{0_p}^2}\right); \arg_{[BR,p]}\min_{p=1,2,\ldots,L}\left(\frac{R_{BR,p}}{R_{BRM,p}^2}\right)\bigg)$$

The selected link is granted the best unallocated subcarrier, on which it can achieve the highest data rate increase. A BS-RS or BS-MS link should cease accepting new subcarriers in this block when it is no longer under-assigned. The subcarrier allocation continues until all BS-RS links cease accepting new subcarriers, or until the subcarriers are exhausted. Note that BS-MS links do not need to meet their minimum data rate requirements in this step.

Block 102: Allocate subcarriers to under-assigned RS-MS and BS-MS links to meet the end-to-end (E2E) data rate requirements of all MSs.

Block 103: If all RS cells are no longer under-balanced, proceed to block 104, otherwise proceed to block 105.

Block 104: If all MSs meet E2E data rate requirements, proceed to block 106, otherwise proceed to block 107.

Block 105: If subcarriers are exhausted in the access zone, proceed to block 108, otherwise proceed to block 102.

Block 106: First allocate remaining subcarriers in relay zone, and then allocate remaining subcarriers in the access zone to match the relay links.

Block 107: Enhance BS-RS links by moving (reallocating) subcarriers from BS-MS links to BS-RS links in the relay zone, compensate BS-MS links in the access zone, and balance BS-RS and RS-MS links.

Block 108: Enhance RS-MS links by moving subcarriers from BS-MS links to RS-MS links in the access zone, compensate BS-MS links in the relay zone, and balance BS-RS and RS-MS links.

As such, in blocks 102-108, subcarriers are assigned one by one to BS-MS and RS-MS links in the access zone to meet the end-to-end data rate requirements of all MSs. Before allocating a subcarrier, the most under-assigned BS/relay cell may be identified based on the following expression:

$$[XM^*, p^*] =$$

$$\left(\frac{R_{BM}}{R_{BM}^2} < \min\left(\frac{R_{RM,p}}{R_{BRM,p}^2}\right)?\bigg| [BM, p = 0]; \arg_{[RM,p]}\min_{p=1,2,\ldots,L}\left(\frac{R_{RM,p}}{R_{BRM,p}^2}\right)\right)$$

Initially, since all relay cells have an achieved data rate equal to zero, the most under-assigned relay cell can be the one with the largest number of MSs, or with the highest required rate. If the BS cell is the first cell picked by a subcarrier, this subcarrier cannot be considered by relay cells any more. The subcarrier is simply assigned to one of the under-assigned BS-MS links, which can achieve the highest data rate increase with the subcarrier. A BS-MS link should cease accepting new subcarriers in block 102 when it meets the minimum data rate requirement, or when it is no longer under-charged. If a relay cell is the first cell picked by a subcarrier, this subcarrier cannot be considered by the BS cell any more. However, other relay cells may reuse this subcarrier. All relay cells that are still under-balanced are examined for this subcarrier based on the ascending sequence of their achieved rate/required rate ratios. A co-channel group is created for this subcarrier including all RS-MS links that are finally assigned this subcarrier.

For each relay cell examined for the subcarrier, all under-assigned RS-MS links within the cell are evaluated. The evaluation considers both data rate increase engendered by each link, as well as data rate decreases it causes to the co-channel links. If none of the RS-MS links can benefit the overall throughput, this relay cell is skipped; otherwise, the link that benefits most to the throughput is added to the co-channel group of the subcarrier. For each relay cell, at most one RS-MS link can be added to the co-channel group of a subcarrier. A relay cell should cease accepting new subcarriers in block 102 when it is no longer under-balanced. The subcarrier allocation of block 102 continues until all links stop accepting subcarriers or until the subcarriers are exhausted. There are three possible results: if all links stop accepting subcarriers, and all MSs meet end-to-end data rate requirements, then allocate remaining subcarriers in both the access zone and the relay zone; if all links stop accepting subcarriers, but one or more two-hop MSs have not met their requirements due to the weak BS-RS links, then enhance those BS-RS links; if subcarriers are exhausted in the access zone before relay cells match the corresponding BS-RS links, then enhance the RS-MS links.

Figure 6:
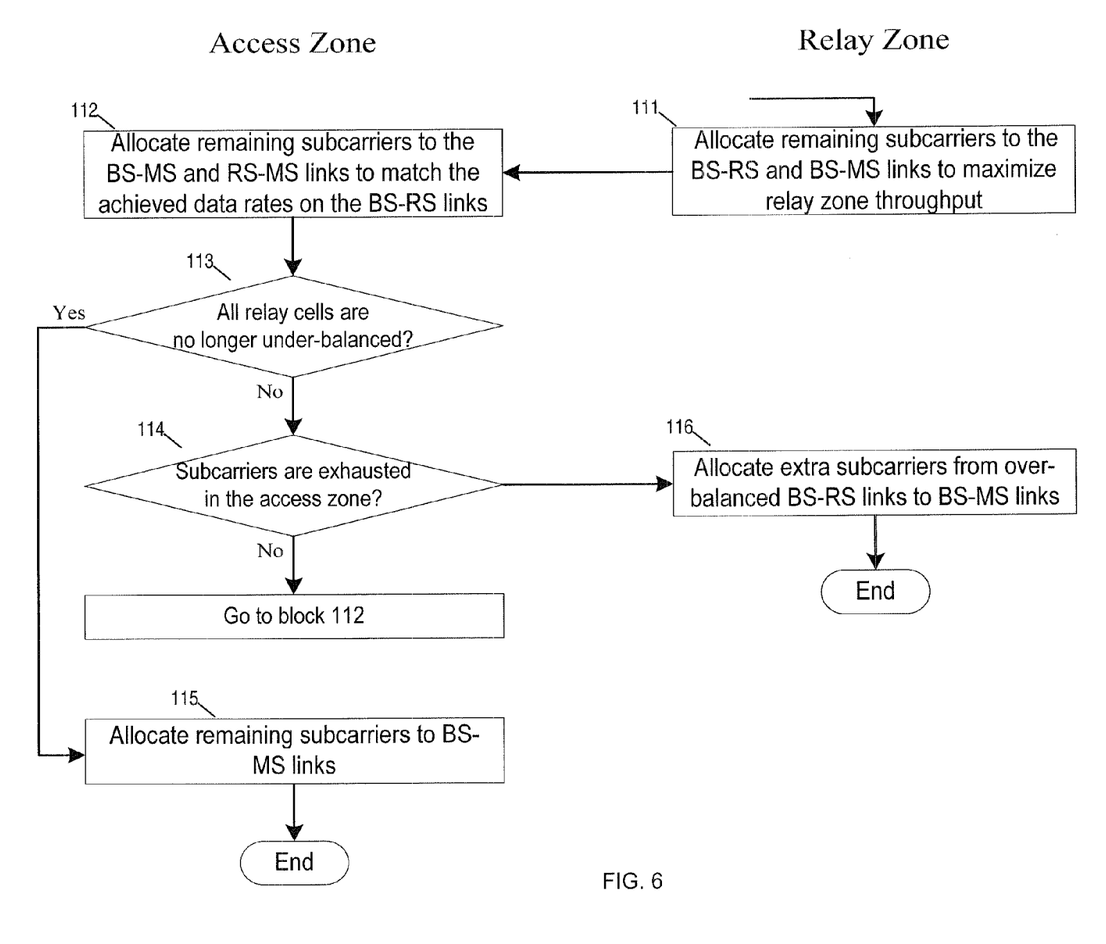
FIG. 6 shows a functional block diagram illustrating details of allocating remaining subcarrier frequency resources in the allocation process of FIG. 5.

FIG. 6 shows further details of the block 106 of FIG. 5, involving two major operations: first, remaining subcarriers in the relay zone are allocated to BS-RS and BS-MS links by using a greedy allocation method; and then, the remaining subcarriers in the access zone are allocated to BS-MS and RS-MS links to match the achieved data rates on the BS-RS links. These operations are implemented as follows:

Block 111: Allocate remaining subcarriers to the BS-RS and BS-MS links to maximize relay zone throughput.

Block 112: Allocate remaining subcarriers to the BS-MS and RS-MS links to match the achieved data rates on the BS-RS links.

Block 113: If all relay cells are no longer under-balanced, proceed to block 114, otherwise proceed to block 115.

Block 114: If all subcarriers are exhausted in the access zone, proceed to block 116, otherwise proceed to block 112.

Block 115: Allocate remaining subcarriers to BS-MS links. End.

Block 116: Allocate extra subcarriers from over-balanced BS-RS links to BS-MS links. End.

In block 111, each of the remaining subcarriers in the relay zone is assigned to the BS-RS or BS-MS link that can achieve the highest data rate increase with the subcarrier. The link selected to accept the subcarrier can be expressed as:

$$[BY^*,p^*]=\arg_{BY,p}\max_{BY=\{BM,BR\}}(\max_{p=1,\ldots,M_0}(r_{BM,O_p}^{(n)}),\max_{p=1,\ldots,L}(r_{BR,O_p}^{(n)}))$$

The resource allocation continues until all subcarriers in the relay zone are exhausted.

In blocks 112-116, in order to assign a remaining subcarrier in the access zone, all under-balanced relay cells are first examined based on the ascending sequence of their balancing ratio (i.e., $R_{RM,p}/R_{BR,p}$ for all p=1, ..., L), similar to block 102 in FIG. 5. For each relay cell under consideration, if none of the RS-MS links in the cell can benefit the overall throughput, this relay cell is skipped; otherwise, the link that provides most benefit to the throughput is added to the co-channel group of the subcarrier. Once all under-balanced relay cells are examined, the aggregated throughput over all relay cells is calculated as:

$$R_{RM}^{(n)} = \sum_{j=1}^{L} \sum_{k=1}^{M_j} \alpha_{RM,j_k}^{(n)} \cdot r_{RM,j_k}^{(n)}$$

And then, the maximum data rate that can be achieved over BS-MS links is calculated as:

$$R_{BM}^{(n)} = \max_{k=1,\ldots,M_0} \{\alpha_{BM,O_k}^{(n)} \cdot r_{BM,O_k}^{(n)}\}.$$

If $R_{BM}^{(n)} \geq R_{RM}^{(n)}$, the subcarrier is assigned to the BS-MS link that achieves the highest data rate increase with the subcarrier. Otherwise, the subcarrier is assigned to the RS-MS links in the co-channel group. A relay cell should cease accepting new subcarriers in block 112 when it is no longer under-balanced. If, before the subcarriers are exhausted, all relay cells cease accepting new subcarriers, the remaining subcarriers are allocated to BS-MS links. Again, each subcarrier is assigned to the BS-MS link that can achieve the highest data rate increase with the subcarrier. If one or more relay cells are still under-balanced when the subcarriers in the access zone are exhausted, the over-balanced BS-RS links release extra subcarriers to BS-MS links in the relay zone. This process continues until the balance between BS-RS and RS-MS links is achieved. When moving (reallocating) subcarriers from BS-RS links to BS-MS links, the subcarrier that provides the least benefit to each over-balanced BS-RS link is picked out and reallocated to one of the BS-MS links. The BS-MS link selected to accept the subcarrier should achieve the highest data rate increase with this subcarrier among all BS-MS links.

Figure 7:
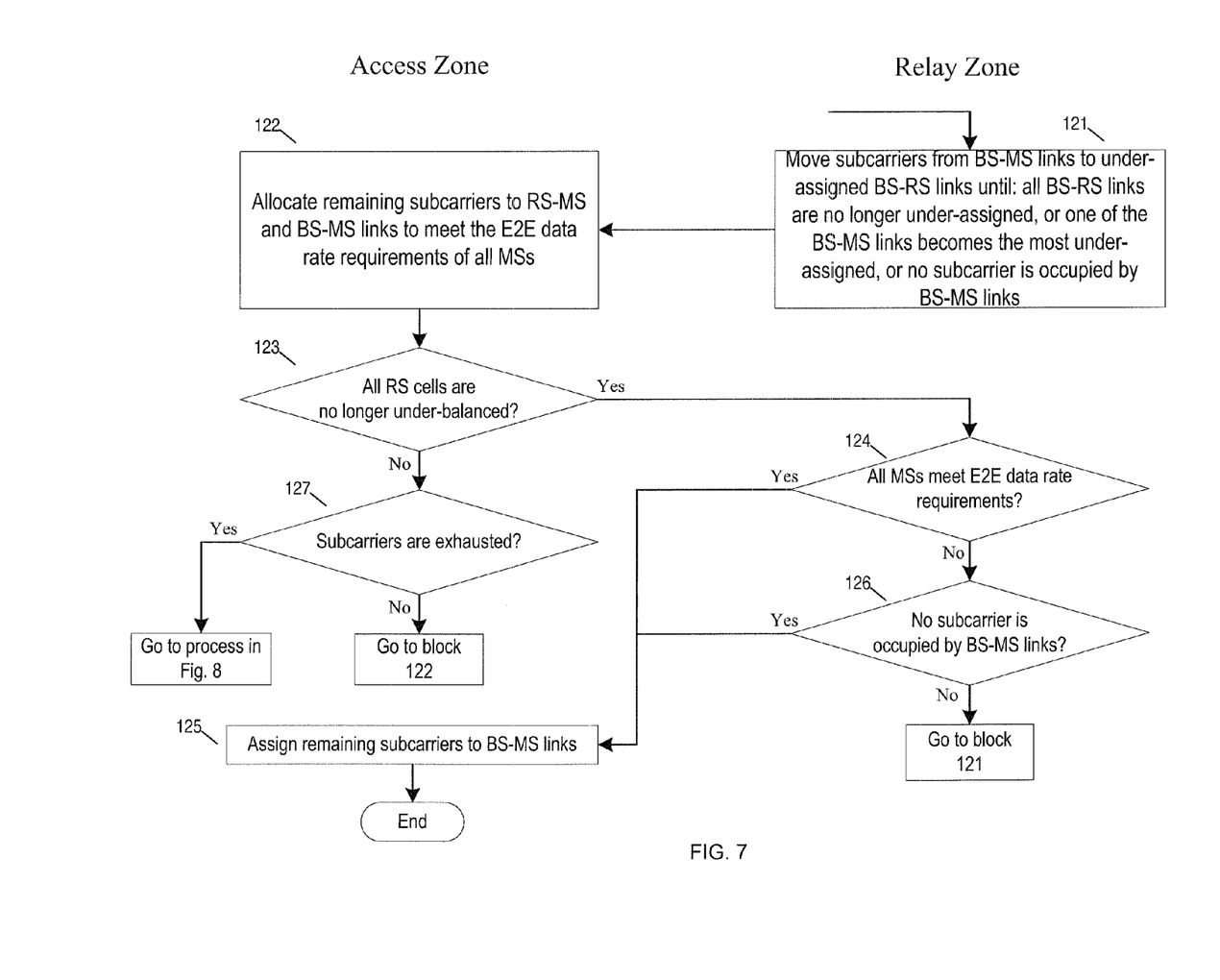
FIG. 7 shows a functional block diagram illustrating details of enhancing BS-RS links by reallocation in the allocation process of FIG. 5.

FIG. 7 shows further details of the block 107 of FIG. 5, involving three major operations: first, subcarriers are moved (reallocated) from BS-MS links to the under-assigned BS-RS links in the relay zone; second, the BS-MS links that sacrifice resources in the relay zone are compensated in the access zone; third, the relay cells that become under-balanced due to the first operation are reinforced. The operations of block 107 include:

Block 121: Move subcarriers from BS-MS links to under-assigned BS-RS links until: all BS-RS links are no longer under-assigned, or one of the BS-MS links becomes the most under-assigned, or no subcarrier is occupied by BS-MS links.

Block 122: Allocate remaining subcarriers to RS-MS and BS-MS links to meet the E2E data rate requirements of all MSs.

Block 123: If all RS cells are no longer under-balanced, proceed to block 124, otherwise proceed to block 127.

Block 124: If all MSs meet E2E data rate requirements, proceed to block 125, otherwise proceed to block 126.

Block 125: Assign remaining subcarriers to BS-MS links. End.

Block 126: If no subcarrier is occupied by BS-MS links, proceed to block 125, otherwise proceed to block 121.

Block 127: If subcarriers are exhausted proceed to process in FIG. 8, otherwise proceed to block 122.

In block 121, all subcarriers occupied by BS-MS links in the access zone now become "available" to the under-assigned BS-RS links. In each adjustment, the most under-assigned BS-RS link is identified and granted the best "available" subcarrier, on which it can achieve the highest data rate increase. Once a subcarrier is reallocated, it no longer belongs to the original host. The subcarrier adjustment continues until one of the following conditions is met: all BS-RS links are no longer under-assigned, or one of the BS-MS links becomes the most under-assigned link, or all subcarriers occupied by BS-MS links are exhausted.

In blocks 122-127, the remaining subcarriers in the access zone are assigned one by one to BS-MS and RS-MS links to meet the end-to-end data rate requirements of all MSs. Those BS-MS links, which sacrifice their resources in the relay zone, are compensated for in the access zone. Further, the relay cells which become under-balanced due to block 121, are enabled to enhance their capacities until a new balance is achieved. A relay cell should cease accepting new subcarriers in block 122 when it is no longer under-balanced. A BS-MS link should stop accepting new subcarriers in block 122 when it meets the minimum data rate requirement, or when it is no longer under-charged.

The subcarrier allocation continues until all links cease accepting subcarriers or until the subcarriers are exhausted. There are three possible results: if all links cease accepting subcarriers, and all MSs meet end-to-end data rate requirements, the remaining subcarriers in the access zone are allocated to BS-MS links (each of the remaining subcarriers is assigned to the BS-MS link that can achieve the highest data rate increase with the subcarrier). If all links stop accepting subcarriers, but one or more two-hop MSs have not met their requirements due to the weak BS-RS links, further subcarrier adjustment is needed in the relay zone to enhance those BS-RS links. As long as there are still subcarriers occupied by BS-MS links in the relay zone, these subcarriers can be released to feed the under-assigned BS-RS links. If all subcarriers occupied by BS-MS links are exhausted, the BS-RS links cannot be improved any further. Therefore, the remaining subcarriers in the access zone are allocated to BS-MS links. If one or more BS-MS links are still under-assigned, the most under-assigned BS-MS links should be satisfied first. After all BS-MS links meet their minimum data rate requirements, the remaining subcarriers are assigned to the BS-MS links that can achieve the highest data rate increases with the subcarriers. If subcarriers are exhausted in the access zone before relay cells match the corresponding BS-RS links, then the process in FIG. 8 is performed.

Figure 8:
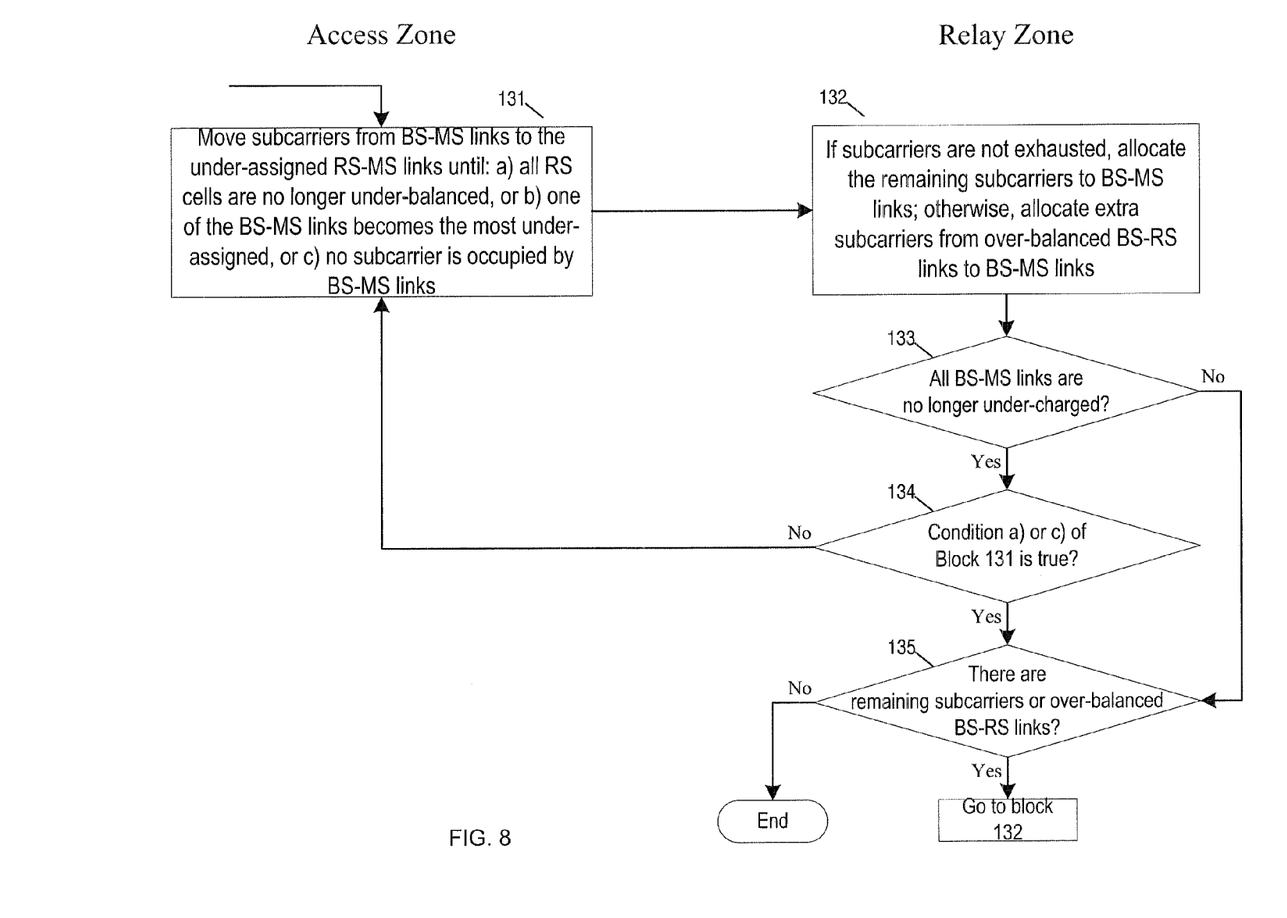
FIG. 8 shows a functional block diagram illustrating details of enhancing RS-MS links in the allocation process of FIG. 5.

FIG. 8 shows further details of the block 108 of FIG. 5, involving three major operations: first, subcarriers are moved from BS-MS links to the under-assigned RS-MS links in the access zone; second, the BS-MS links that sacrifice resources in the access zone are compensated in the relay zone. These operations are implemented as follows:

Block 131. Move subcarriers from BS-MS links to the under-assigned RS-MS links until: a) all RS cells are no longer under-balanced, or b) one of the BS-MS links becomes the most under-assigned, or c) no subcarrier is occupied by BS-MS links.

Block 132: If subcarriers are not exhausted, allocate the remaining subcarriers to BS-MS links; otherwise, allocate extra subcarriers from over-balanced BS-RS links to BS-MS links.

Block 133: If all BS-MS links are no longer under-charged, proceed to block 134, otherwise proceed to block 135.

Block 134: If conditions a) or c) in block 131 are met, then proceed to block 135, otherwise proceed back to block 131.

Block 135. If there are remaining subcarriers or over-balanced BS-RS links, proceed to block 132, otherwise end.

In block 131, subcarriers occupied by BS-MS links in the access zone become "available" to the under-assigned RS-MS links. The sequence to allocate these subcarriers can be random, or based on certain priorities, such as the descending sequence of the average achievable rates over all two-hop MSs. Another possible sequence is that the BS-MS links that are better assigned (i.e., with higher achieved rate/required rate ratios) may release subcarriers earlier. Each "available" subcarrier can be assigned to one or more RS-MS links. This subcarrier adjustment continues until one of the following conditions is met: all relay cells are no longer under-balanced, or one of the BS-MS links becomes the most under-assigned link, or all subcarriers occupied by BS-MS links are exhausted.

Blocks 132-135 enable those BS-MS links, which sacrifice their resources in the access zone, to be compensated in the relay zone. If the subcarriers in the relay zone are not exhausted, the BS-MS links are "charged" (i.e., allocated resources) by the remaining subcarriers. In each iteration, the most under-assigned BS-MS link is identified and granted the best unallocated subcarrier. If the subcarriers in the access zone are already exhausted, the BS-MS links are "charged" by the subcarriers reallocated from the over-balanced BS-RS links. In each of multiple iteration, the most over-balanced BS-RS link is first identified; and then, the subcarrier that provides least benefit to the BS-RS link is picked out and reallocated to one of the under-charged BS-MS links. The BS-MS link selected to accept the subcarrier should achieve the highest data rate increase with this subcarrier among all under-charged BS-MS links.

Once all BS-MS links are no longer under-charged, they are ready to release subcarriers to the RS-MS links in the access zone if both of the following conditions are met: there are still subcarriers occupied by BS-MS links in the access zone, and one or more relay cells are under-balanced. If at least one of these two conditions cannot be met, the BS-MS links continue accepting remaining subcarriers, as well as reallocated subcarriers from the over-balanced BS-RS links, in the access zone. The subcarriers are first allocated to the under-assigned BS-MS links enable BS-MS links to meet the minimum data rate requirements. Thereafter, each remaining subcarrier is assigned to the BS-MS link that can achieve the highest data rate increase with the subcarrier. The process ends when subcarriers are exhausted in the relay zone, and all BS-RS links are no longer over-balanced.

Figure 9:
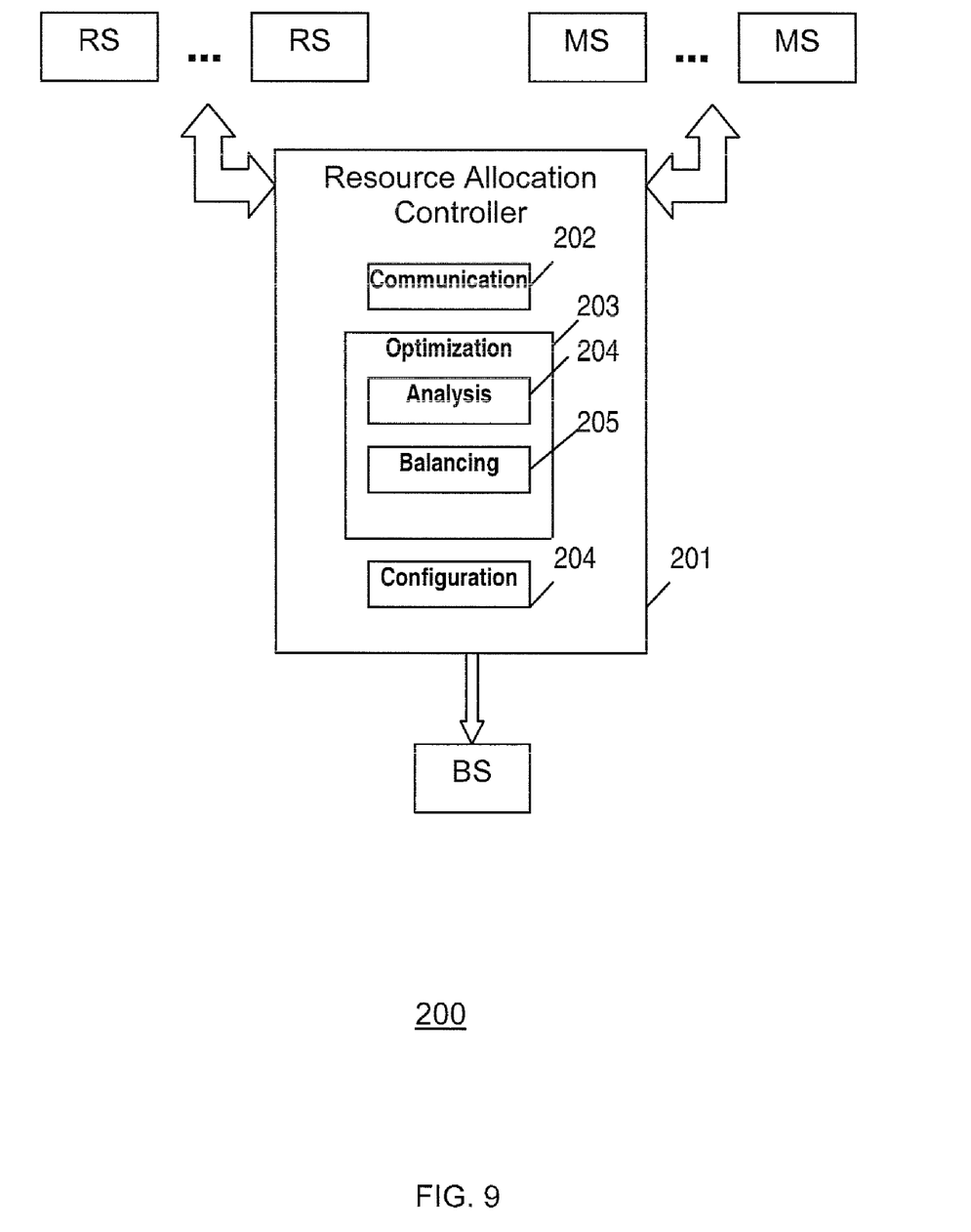
FIG. 9 shows a functional block diagram of a resource allocation controller configured for allocating subcarrier frequency resources for a relay enhanced cellular communication system, according to an embodiment of the invention.

FIG. 9 shows a functional block diagram of a relay enhanced cellular system 200 including a resource allocation controller 201 configured for allocating subcarrier frequency resources, according to an embodiment of the invention. The controller implements the blocks in FIGS. 5-8, described above. The controller 201 includes a communication module 202, an optimization module 203 and a configuration module 204. The communication module exchanges information with the RS and MS stations. The optimization module includes an analysis module 204 and a balancing module 205. The analysis module determines link throughput and assigned/underassigned status of the RS-MS and BS-RS links as described above. The balancing module determines a balancing plan for allocation/reallocation/assignment of subcarrier resources to the links based on the analysis results. The configuration module communicates with the BS, RS and MS stations to configure them according to the balancing plan.

The controller allocates subcarrier frequency resources for a relay enhanced cellular communication system by assigning a set of subcarriers, including the steps of allocating subcarriers to one or more relay communication links between the base station and relay stations, to accommodate minimum data rate requirements of the access communication links; and allocating subcarriers to one or more access communication links between relay stations and mobile stations to approximate the data rates achieved on the corresponding relay communication links, wherein allocating subcarriers to one or more access communication links includes reusing subcarriers among access communication links in different relay cells. Remaining subcarriers are allocated to access communication links and relay communication links to maximize system-wide throughput, when all mobile stations meet their minimum data rate requirements; wherein allocating subcarriers to access communication links includes reusing subcarriers among access communication links in different relay cells.

In this example, the communication system comprises an Orthogonal Frequency Division Multiple Access relay enhanced cellular communication system. Assigning a set of subcarriers may further include balancing subcarrier allocation for access communication links and relay communication links. Balancing involves subcarrier allocation for access communication links and relay communication links, without incurring subcarrier adjustment/reallocation among access communication links.

Assigning a set of subcarriers to one or more access communication links my further include: detecting a serving station (including the base station and relay stations), among all under-assigned serving stations, with the least achievement-requirement data rate ratio on its access communication links; if the detected station is a base station, then allocating a subcarrier to the base station, wherein the allocated subcarrier may not be reused by any relay station; and if the detected station is a relay station, then allocating a subcarrier to the relay station, wherein the allocated subcarrier may be reused by the base station. Assigning a set of subcarriers may further include, if a subcarrier is allocated to an under-assigned relay station, the subcarrier can also be allocated to other under-assigned relay stations if these allocations can benefit the overall system throughput.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of allocating subcarrier frequency resource for a relay enhanced cellular communication system including a base station, one or more mobile stations and one or more relay stations, comprising:
    assigning a set of subcarriers by:
        allocating subcarriers to one or more relay communication links between the base station and relay stations, to accommodate minimum data rate requirements of one or more access communication links between relay stations and mobile stations;
        allocating subcarriers to the one or more access communication links between relay stations and mobile stations to approximate the data rates achieved on the corresponding relay communication links, wherein allocating subcarriers to one or more access communication links includes reusing subcarriers among access communication links in different relay cells and assigning the set of subcarriers to one or more access communication links by:
    detecting a serving station, among all under-assigned serving stations, with a least achievement-requirement data rate ratio on its access communication links, wherein a serving station is one of a base station or a relay station; and
    for a subcarrier allocated to an under-assigned relay station, selectively allocating that subcarrier to other under-assigned relay stations when such allocation benefits overall system throughput.

2. The method of claim 1, wherein assigning subcarriers further includes:
    allocating remaining subcarriers to access communication links and relay communication links to essentially maximize system-wide throughput, when all mobile stations meet their minimum data rate requirements;
wherein allocating subcarriers to access communication links includes reusing subcarriers among access communication links in different relay cells.

3. The method of claim 2, wherein the communication system comprises an Orthogonal Frequency Division Multiple Access relay enhanced cellular communication system.

4. The method of claim 2, wherein assigning a set of subcarriers further includes balancing subcarrier allocation for access communication links and relay communication links.

5. The method of claim 4, wherein assigning a set of subcarriers further includes balancing subcarrier allocation for access communication links and relay communication links, without adjusting allocation of subcarriers among access communication links in different relay cells.

6. The method of claim 2, wherein
    if the detected station is a base station, then allocating a subcarrier to the base station, wherein the allocated subcarrier cannot be reused by any relay station; and
    if the detected station is a relay station, then allocating a subcarrier to the relay station, wherein the allocated subcarrier cannot be reused by the base station but may be reused by some other relay stations.

7. The method of claim 6, wherein if a subcarrier is allocated to the under-assigned relay station, the subcarrier can also be allocated to other under-assigned relay stations if the allocations can benefit the overall system throughput.

8. An apparatus for allocating subcarrier frequency resource for a relay enhanced cellular communication system including a base station, one or more mobile stations and one or more relay stations, comprising:
    a hardware processor coupled with:
        an optimization module configured for assigning a set of subcarriers by:
            allocating subcarriers to one or more relay communication links between the base station and relay stations, to accommodate minimum data rate requirements of one or more access communication links between relay stations and mobile stations; and
            allocating subcarriers to the one or more access communication links between relay stations and mobile stations to approximate the data rates achieved on the corresponding relay communication links, wherein allocating subcarriers to one or more access communication links includes reusing subcarriers among access communication links in different relay cells;

wherein the optimization module includes a balancing module configured such that if a subcarrier is allocated to an under-assigned relay station, the subcarrier can also be allocated to other under-assigned relay stations if the allocations can benefit overall system throughput; and wherein the optimization module includes an analysis module configured for detecting a serving station, among all under-assigned serving stations, with a least achievement-requirement data rate ratio on its access communication links, wherein a serving station is one of a base station or a relay station.

9. The apparatus of claim 8, wherein the optimization module is further configured for allocating remaining subcarriers to access communication links and relay communication links to essentially maximize system-wide throughput, when all mobile stations meet their minimum data rate requirements;

wherein allocating subcarriers to access communication links includes reusing subcarriers among access communication links in different relay cells.

10. The apparatus of claim 9, wherein the communication system comprises an Orthogonal Frequency Division Multiple Access relay enhanced cellular communication system.

11. The apparatus of claim 9, wherein the balancing module is further configured for balancing subcarrier allocation for access communication links and relay communication links.

12. The apparatus of claim 11, wherein the balancing module is further configured for balancing subcarrier allocation for access communication links and relay communication links, without adjusting allocation of subcarriers among access communication links in different relay cells.

13. The apparatus of claim 9, wherein the analysis module is further configured such that if the detected station is a base station, then the balancing module allocates a subcarrier to the base station, wherein the allocated subcarrier cannot be reused by any relay station, and if the detected station is a relay station, then the balancing module allocates a subcarrier to the relay station, wherein the allocated subcarrier cannot be reused by the base station but may be reused by some other relay stations.

14. A relay enhanced cellular communication system, comprising:

a base station, one or more mobile stations and one or more relay stations;

a controller configured for allocating subcarrier frequency resources, the controller comprising an optimization module configured for assigning a set of subcarriers by:
allocating subcarriers to one or more relay communication links between the base station and relay stations, to meet minimum data rate requirements of one or more access communication links between relay stations and mobile stations;
allocating subcarriers to the one or more access communication links between relay stations and mobile stations to approximate the data rates achieved on the corresponding relay communication links, wherein allocating subcarriers to one or more access communication links includes reusing subcarriers among access communication links in different relay cells; and wherein the optimization module includes a balancing module configured such that if a subcarrier is allocated to an under-assigned relay station, the subcarrier can also be allocated to other under-assigned relay stations if the allocations can benefit overall system throughput, and wherein the optimization module includes an analysis module configured for detecting a serving station, among all under-assigned serving stations, with a least achievement-requirement data rate ratio on its access communication links, wherein a serving station is one of a base station or a relay station.

15. The system of claim 14, wherein the optimization module is further configured for allocating remaining subcarriers to access communication links and relay communication links to essentially maximize system-wide throughput, when all mobile stations meet their minimum data rate requirements;

wherein allocating subcarriers to access communication links includes reusing subcarriers among access communication links in different relay cells.

16. The system of claim 15, wherein the communication system comprises an Orthogonal Frequency Division Multiple Access relay enhanced cellular communication system.

17. The system of claim 15, wherein the balancing module is further configured for balancing subcarrier allocation for access communication links and relay communication links.

18. The system of claim 17, wherein the balancing module is further configured for balancing subcarrier allocation for access communication links and relay communication links, without adjusting allocation of subcarriers among access communication links in different relay cells.

19. The system of claim 16, wherein the analysis module is further configured such that if the detected station is a base station, then the balancing module allocates a subcarrier to the base station, wherein the allocated subcarrier cannot be reused by any relay station, and if the detected station is a relay station, then the balancing module allocates a subcarrier to the relay station, wherein the allocated subcarrier cannot be reused by the base station but may be reused by some other relay stations.

20. The system of claim 14, wherein each relay station defines a relay cell.

21. A controller, comprising:

a hardware processor coupled with
an optimization module configured for assigning a set of subcarriers by:
allocating subcarriers to one or more relay communication links between a base station and relay stations, to meet minimum data rate requirements of one or more access communication links between relay stations and mobile stations; and
allocating subcarriers to the one or more access communication links between relay stations and mobile stations to approximate the data rates achieved on the corresponding relay communication links; and
a balancing module configured such that if a subcarrier is allocated to an under-assigned relay station, the subcarrier can also be allocated to other under-assigned relay stations if the allocations can benefit overall system throughput;

wherein the optimization module includes an analysis module configured for detecting a serving station, among all under-assigned serving stations, with a least achievement-requirement data rate ratio on its access communication links, wherein a serving station is one of a base station or a relay station.

22. The controller of claim 21, wherein allocating subcarriers to one or more access communication links includes reusing subcarriers among access communication links in different relay cells.

23. An apparatus for allocating subcarrier frequency resource for a relay enhanced cellular communication system, comprising:
a hardware processor coupled with
an optimization module configured for assigning a set of subcarriers based on:
allocating subcarriers to one or more relay communication links between the base station and relay stations, for accommodating minimum data rate requirements of one or more access communication links between relay stations and mobile stations; and
allocating subcarriers to the one or more access communication links between relay stations and mobile stations to approximate the data rates achieved on the corresponding relay communication links; and
an analysis module configured for detecting a serving station, among all under-assigned serving stations, with the least achievement-requirement data rate ratio on its access communication links, wherein a serving station is one of a base station or a relay station, such that if the detected station is a base station, then a balancing module allocates a subcarrier to the base station;
wherein the optimization module includes an analysis module configured for detecting a serving station, among all under-assigned serving stations, with a least achievement-requirement data rate ratio on its access communication links, wherein a serving station is one of a base station or a relay station.

24. The apparatus of claim 23, wherein the allocated subcarrier cannot be reused by any relay station, and if the detected station is a relay station, then the balancing module allocates a subcarrier to the relay station, wherein the allocated subcarrier cannot be reused by the base station but may be reused by some other relay stations.

* * * * *